United States Patent
He et al.

(10) Patent No.: US 9,180,615 B2
(45) Date of Patent: Nov. 10, 2015

(54) METHOD OF MAKING A MULTIPLE-LAYERED PLASTIC PART

(75) Inventors: Zhaoyuan He, Shanghai (CN); Shipu Cao, Shanghai (CN); Yi Li, Shanghai (CN); Xin Kong, Shanghai (CN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 939 days.

(21) Appl. No.: 13/239,724

(22) Filed: Sep. 22, 2011

(65) Prior Publication Data
US 2013/0078444 A1  Mar. 28, 2013

(51) Int. Cl.
*B29C 45/16* (2006.01)

(52) U.S. Cl.
CPC ....... *B29C 45/1635* (2013.01); *B29C 2045/166* (2013.01); *B29C 2045/1637* (2013.01); *B29C 2045/1682* (2013.01)

(58) Field of Classification Search
CPC .......... B29C 45/1635; B29C 45/1637
USPC .............................. 264/255, 328.7
See application file for complete search history.

(56) References Cited

U.S. PATENT DOCUMENTS

| | | | | |
|---|---|---|---|---|
| 206,536 | A | * | 7/1878 | Carter ........................ 425/130 |
| 3,363,039 | A | * | 1/1968 | Nagai et al. ................. 264/245 |
| 3,466,700 | A | * | 9/1969 | Harrison .................... 425/129.1 |
| 3,670,066 | A | * | 6/1972 | Valyi ........................... 264/148 |
| 4,339,408 | A | * | 7/1982 | Jenkins ...................... 264/328.7 |
| 4,710,332 | A | * | 12/1987 | Rosman ....................... 264/632 |
| 4,778,632 | A | * | 10/1988 | Bakalar ......................... 264/2.2 |
| 4,980,115 | A | * | 12/1990 | Hatakeyama et al. ...... 264/328.7 |
| 5,071,335 | A | * | 12/1991 | Riedel et al. .................. 425/130 |
| 5,676,896 | A | * | 10/1997 | Izumida et al. ............... 264/132 |
| 6,099,949 | A | | 8/2000 | Nomura et al. |
| 2003/0183665 | A1 | | 10/2003 | Olk et al. |
| 2005/0285303 | A1 | | 12/2005 | Balint et al. |
| 2009/0317648 | A1 | | 12/2009 | Kong |
| 2010/0187723 | A1 | | 7/2010 | Miyazawa et al. |

FOREIGN PATENT DOCUMENTS

| | | |
|---|---|---|
| DE | 10204806 A1 | 8/2003 |
| JP | 04078513 | 3/1992 |
| JP | 10315262 | 12/1998 |
| JP | H11100919 A | 4/1999 |

(Continued)

OTHER PUBLICATIONS

German Patent No. 10204806 (A1); Publication Date: Aug. 14, 2003; Machine Translation; 6 pages.

(Continued)

*Primary Examiner* — Edmund Lee
(74) *Attorney, Agent, or Firm* — Cantor Colburn LLP

(57) ABSTRACT

In some embodiments, a tool includes, in an injection molding machine, a movable internal core configured to receive a molded plastic layer thereon, the molded plastic layer having a thickness. The tool also comprises an injection nozzle configured to inject plastic material over the movable internal core to form the molded plastic layer; an ejection plate connected to the movable internal core; and multiple, movable support plates each having a thickness. The multiple, movable support plates are located behind the ejection plate. A movable support plate of the multiple, movable support plates is configured to determine the thickness of the molded plastic layer.

18 Claims, 8 Drawing Sheets

(56) References Cited

FOREIGN PATENT DOCUMENTS

| | | |
|---|---|---|
| JP | 2000079625 A | 3/2000 |
| JP | 2000108161 A | 4/2000 |
| JP | 2000301583 A | 10/2000 |
| JP | 2003138122 A | 5/2003 |
| JP | 2004243686 A | 9/2004 |
| JP | 2004255621 A | 9/2004 |
| JP | 2008155503 A | 7/2008 |
| JP | 2010094943 | 4/2010 |

OTHER PUBLICATIONS

Japanese Patent No. 2000-079625 (A); Publication Date: Mar. 21, 2000; Abstract Only; 1 page.

Japanese Patent No. 2000-301583 (A); Publication Date: Oct. 31, 2000; Abstract Only; 2 pages.

Japanese Patent No. 2003-138122 (A); Publication Date: May 14, 2003; Abstract Only; 1 page.

Japanese Patent No. 2008-155503; Publication Date: Jul. 10, 2008; Abstract Only; 1 page.

Japan Patent Publication o. 04078513, Dec. 3, 1992, Abstract Only, 1 page.

Japan Patent Publication No. 10315262, Feb. 12, 1998, Abstract Only, 1 page.

Japan Patent Publication No. 2010094943, Apr. 30, 2010, Abstract Only, 1 page.

Kaeufer et al., "Fügen Urformen Mit Polyreaktion (FUP), Ein Verfahren Zur Herstellung Flag Chen Hafter Plastomer-Duromer-Verbundteile", Plastverarbeiter, vol. 29, No. 1, 1978, 3 pages.

International Search Report for International Application No. PCT/IB2012/054935, International Application Filing Date Sep. 18, 2010, Date of Mailing Jan. 17, 2013, 5 pages.

Written Opinion for International Application No. PCT/IB2012/054935, International Application Filing Date Sep. 18, 2012, Date of Mailing Jan. 17, 2013, 8 pages.

\* cited by examiner

METHOD OF MAKING A MULTIPLE-LAYERED PLASTIC PART

BACKGROUND

The present disclosure generally relates to thick plastic parts, and more particularly, to a method of making a thick plastic part and a molding tool for making a thick plastic part.

Injection molding is a process for manufacturing products made of plastic. In general, molten plastic material is injected into a mold wherein the material solidifies upon cooling. The molded product of desired shape then can be removed from the mold for use. However, conventional injection molding typically cannot achieve a thick part, such as a part greater than 5 millimeters (mm) in thickness without sinks, bubbles or voids inside the part.

Such thick parts are often needed for producing CNC (computer numerical control) prototype parts. Extrusion processes are typically employed to make such thick parts, but extrusion can consume a lot of resin as large amounts of the resin need to be added inside the machinery for processing. Thus, this type of manufacturing process can be costly.

Moreover, extrusion processes are not adaptable for all NPI (new product initiation) grades of material, and during the development stage of new resin materials, a sufficient size sample of the material may not be available from the laboratory.

Accordingly, alternative processes for making thick plastic parts and tools for making such plastic parts are desired.

BRIEF DESCRIPTION

Disclosed herein are methods for making thick plastic parts, molding tools for making the thick plastic parts, and thick plastic parts made by the methods.

In some embodiments, a method of making a multiple-layered plastic part, comprises: a) injecting a material onto an internal core of a tool to form a molded layer, the tool comprising support plates, each support plate having a thickness; b) opening the tool and removing a support plate; c) closing the tool, wherein a gap having a thickness is created in the tool, the thickness of the gap being determined by the thickness of the support plate removed in b); d) molding a further layer over the molded layer and within the gap, the thickness of the further layer being determined by the thickness of the support plate removed in b); and repeating b) through d) to produce the molded multiple-layered plastic part.

In one embodiment, a method of making a plastic part comprises: a) injecting a first material onto an internal core of a tool to form a molded layer; b) opening the tool and removing a first support plate; c) closing the tool, wherein a gap having a thickness is created in the tool, the thickness of the gap being determined by the thickness of the first support plate removed in b); and d) molding a second layer over the first layer and within the gap, the thickness of the second layer being determined by the thickness of the first support plate removed in b), to produce the plastic part.

In another embodiment, a thick plastic part is disclosed made by an above method and having a thickness greater than or equal to ($\geq$) 5 mm.

In a further embodiment, a tool comprises, in an injection molding machine, a movable internal core configured to receive a molded plastic layer thereon, the molded plastic layer having a thickness. The tool also comprises an injection nozzle configured to inject plastic material over the movable internal core to form the molded plastic layer; an ejection plate connected to the movable internal core; and multiple, movable support plates each having a thickness. The multiple, movable support plates are located behind the ejection plate. A movable support plate of the multiple, movable support plates is configured to determine the thickness of the molded plastic layer.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The inventors have developed a sequential, multiple-layer molding process, and a tool, which can enable the production of thick, molded parts, without the formation of sinks, bubbles or voids, according to embodiments. The tool can be used to produce a stepwise process of molding layers on top of one another with the use of multiple support plates that are removable and that can control the thickness of the resultant layers of a product, according to embodiments.

The inventors have determined that the use of multiple support plates that are removable and located behind an ejector plate can create a gap within the cavity upon removal of a support plate by moving an internal core which receives the layers of the product and which is connected to the ejector plate, as opposed to moving the mold, according to embodiments. This can allow injection of additional layers onto the internal core and production of multiple layered plastic parts of large size. The inventors have further determined, according to embodiments, that roughening the surface at the cavity side to provide texture can enable effective adhesion between the layers by increasing the adhesion force between adjacent layers. Moreover, the inventors have determined that the use of an internal core comprising an undercut, according to embodiments, can help the deposited layers/product adhere to the movable internal core. Thus, when the internal core moves, the deposited layers/product can move along with the internal core and not stick with or adhere to the cavity side. Such features of molding machinery and processing are believed to satisfy an unmet need in the industry according to the inventors' knowledge, and are further described below.

Figure 1:
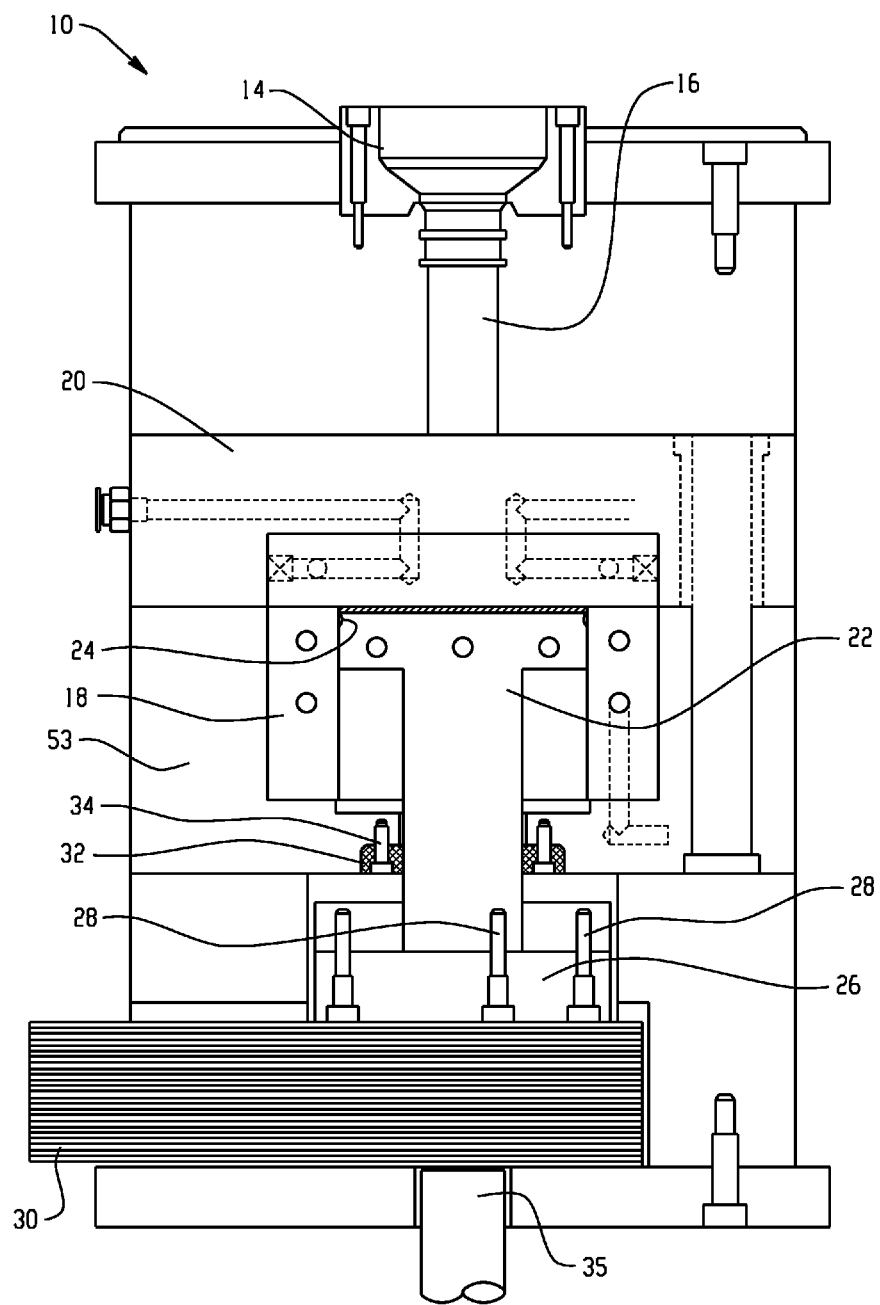
FIG. 1 is a depiction of an assembly drawing of a molding tool, in accordance with an embodiment.
Figure 2:
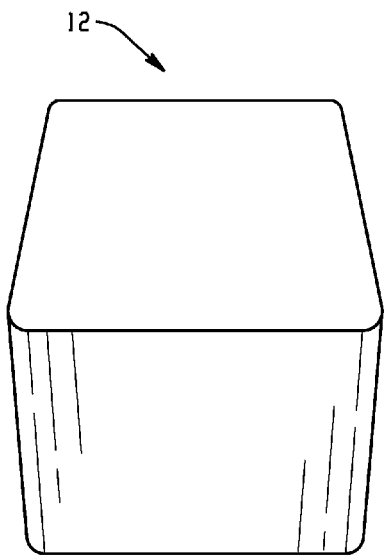
FIG. 2 is a depiction of a thick, molded block, in accordance with an embodiment.

FIG. 1 illustrates an assembly drawing of major components of a molding tool 10, according to one embodiment, for making a multiple-layered molded part 12. For illustration purposes only, the following description is of molding tool 10 for making multiple-layered molded part 12 in the form of a large block, as shown in FIG. 2, and as further described below.

As shown in FIG. 1, tool 10 can comprise a hot nozzle (injection nozzle) 16 for delivering desired material, for example, thermoplastic resin through cavity 20 having an outer core 18 via the nozzle 16 to movable internal core 22. Also shown in FIG. 1 is location ring 14, which is a component that can locate tool 10 into an injection machine. The resin can flow directly from the injection machine to hot nozzle 16.

Movable internal core 22 is on the core side (movable side) of the tool 10 and thus can receive the delivered, desired material for the final product, according to embodiments. Thus, the cavity side or mold can remain stationary. It is noted that with conventional processing, typically a core insert does not move. However, according to embodiments, the inventors have determined how to make internal core 22 move and create a space or gap after each deposit of material for each layer.

Figure 3A:
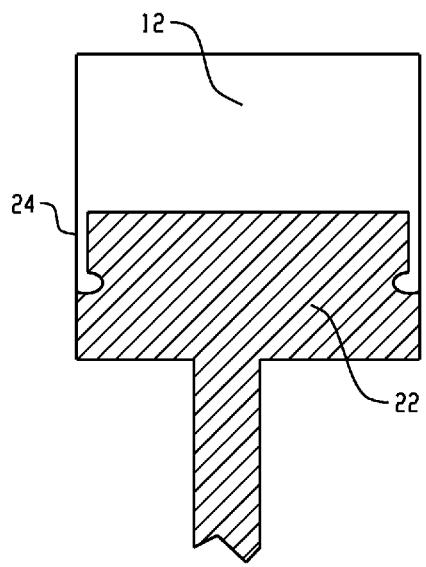
FIG. 3A and FIG. 3B depict an undercut for use in the tool of FIG. 1.
Figure 3B:
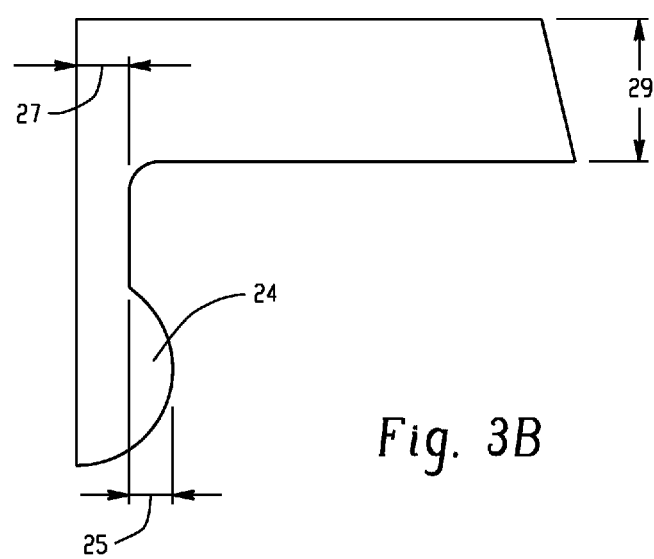

Movable internal core 22 also can comprise an undercut 24, an example of which is shown in FIG. 1 and FIGS. 3A and 3B. The undercut 24 can be a feature of internal core 22. More particularly, movable internal core 22 can comprise undercut 24 to help the deposited layers/product adhere to the internal core 22. Thus, when the internal core 22 moves, the deposited layers/product can move along with the internal core 22 and the undercut 24, and not stick with the cavity side. Thus, according to embodiments, the undercut 24 is an object located on a surface of the internal core 22 where material can be deposited and which functions to adhere deposited material to the internal core 22 so that the internal core 22 and deposited material can move together. The undercut 24 can be made of any suitable material and in any suitable shape and size, depending upon the size of the product (molded part 12). For example, the undercut 24 can comprise a section 25 or interference 25 of 0.3 mm to 0.5 mm in thickness, which can, for example, hook around the internal core 22. The undercut 24 is shown in FIG. 3A as comprising the same material as the product (molded part 12). However, different materials also can be employed. The undercut 24 could be removed from molded part 12 after production by, for example, applying a pulling or breaking force to separate the undercut 24 from the molded part 12. FIG. 3A shows an example of undercut 24 at the bottom of a molded part 12 having semi-round shape at two sides. In accordance with another embodiment, four areas or sections of undercut of desired size depending upon the size of the product can be located at four corners of the core 22. FIG. 3B depicts an enlarged view of the undercut 24 shown in FIG. 1. The undercut 24 of FIG. 3B can have, for example, an interference 25 or section 25 of ≥0.5 mm, a width 27 of ≥1 mm and a height 29 of ≥2.5 mm, although other dimensions could be employed.

Figure 4:
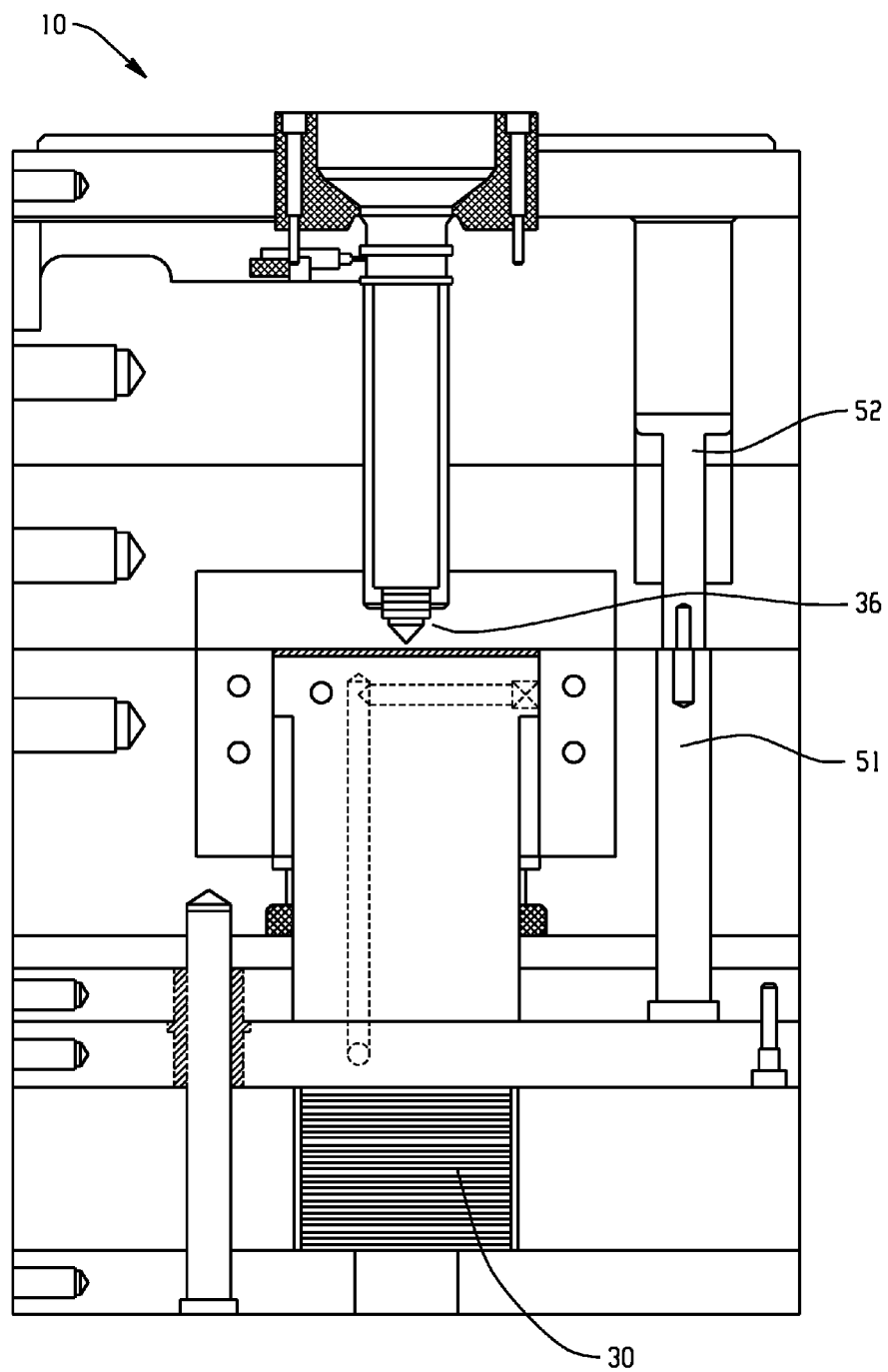
FIG. 4 is a depiction of another assembly drawing of the molding tool of FIG. 1.

Tool 10 also can comprise an ejector plate 26, as shown in FIG. 1 connected to the movable internal core 22 by screws 28. Ejector plate 26 is connected by return pin 51, which will be driven by early return pin 52 when the tool 10 is closed, according to embodiments. Pins 51 and 52 are shown in FIG. 4.

Multiple, removable support plates 30 can be advantageously located behind the ejector plate 26. The ejector plate 26 can be connected to movable internal core 22 by screws 28, for example, such that when a support plate 30 behind the ejector plate 26 is removed, a space or gap can be created behind the ejector plate 26 and the ejector plate 26 can move down or back. The movable internal core 22 can thus also move with the ejector plate 26, for example, down or back and a space or gap can be created for deposit of the next layer of material or shot.

The number of support plates 30, as well as the thickness of support plates 30 can vary, as desired depending upon, for example, the desired size and thickness of the resultant part 12. For example, FIGS. 5A and 5B described below show ten support plates 30. However, less than or greater than ten support plates 30 could be employed.

The thickness of the support plates 30 is dependent upon the ability to mold the layer without defects. A typical thickness of each of the support plates 30 can be 0.2 mm to 10 mm, which could be varied depending on what final thickness combination needs to be achieved. The thickness of each of the support plates 30 could be the same or could be different. As further explained below, the thickness of the particular support plate 30 removed can determine or control the thickness of the respective deposited layer. Thus, a molded part 12 could be produced with layers having the same or different thickness. Support plates 30 also can be made of any suitable material, and are typically made of metal.

As shown in FIG. 1, according to an embodiment, a wear sleeve 32 is fixed to cavity plate 53 by screw 34. The wear sleeve 32 can be located around movable internal core 22 as this can be a wearing area of the tool 10. For example, if this area has been sufficiently worn because of use, a gap can be created inside the tool 10. With use of a wear sleeve 32, the wear sleeve 32 can absorb the wearing and be replaced as needed, thereby protecting the internal core 22 and surrounding area. In accordance with an embodiment, the hardness of the wear sleeve 32 should be lower than the hardness of the internal core (bar) 22, so that the wear plate, which is surrounded by the wear sleeve 32, is the first component to be worn thereby protecting the internal core 22.

FIG. 4 shows an additional view of tool 10 of FIG. 1. More particularly, FIG. 4 depicts an assembly drawing of tool 10 showing the injection tip 36 of nozzle 16, and early return pin 51.

It is noted that, in accordance with an embodiment, it is desirable to set up a water cooling line in the internal core 22 area to ensure that the internal core 22 is cooled and temperature controlled. The water line of internal core 22 can be connected to ejector plate 26, according to embodiments. The water outlet and inlet can be opened at the side of the ejector plate 26, as would be understood by a person skilled in the art.

Tool 10 will be described in further detail below with respect to its operation, according to embodiments.

Referring to FIG. 1, during operation of tool 10 in accordance with one embodiment, resin in the form of desired sized pellets can be added to a hopper (not shown). It is noted that any suitable material can be employed to be added to the hopper such as, for example, any suitable plastic material including thermoplastic materials. Examples of suitable plastic materials include, but are not limited to, polypropylene, polycarbonate, polystyrene, blends of the foregoing, and the like. As a further example, the material for each deposited layer could be a material suitable for use in double shot molding processes, and the material used for each layer could be the same or different.

Similarly, any suitable sized pellets can be added to the hopper. Accordingly, resin pellets can be fed from the hopper into hot nozzle 16. The resin can then be injected through nozzle 16 for delivering the resin to the movable internal core 22.

The afore-referenced hot nozzle 16 (or hot sprue) also could heat the resin once molded. However, some materials are not ideal for application using a hot sprue, for example, materials having a high coefficient of thermal expansion coefficients or if alternating layers of materials of different color are desired to be deposited. Accordingly, it is noted that hot nozzle 16 could be replaced by a cold sprue or opening through which the materials could flow through, according to embodiments. If a cold sprue is used, any solidified, undesired material remaining in the opening should be cut after each shot is finished as this material is not desirable as part of the final molded product.

The resin can be controlled by stopping and starting the flow using the turning of a screw within the injection nozzle 16, and the machinery can be operated by computer control in the injection machine.

Thus, in accordance with an embodiment, a method of making a multiple-layered molded part 12, such as the thick plastic block shown in FIG. 2, also is disclosed. In accordance with one embodiment, a method comprises providing a tool 10. As described above, tool 10 can comprise an outer core 18 and a cavity 20, a movable internal core 22 comprising an undercut 24, an injection nozzle 16, multiple, support plates 30, which are movable, of desired thickness and an ejector plate 26 connected to the internal core 22. All of the support plates 30 can be located behind the ejector plate 26.

Figure 5A:
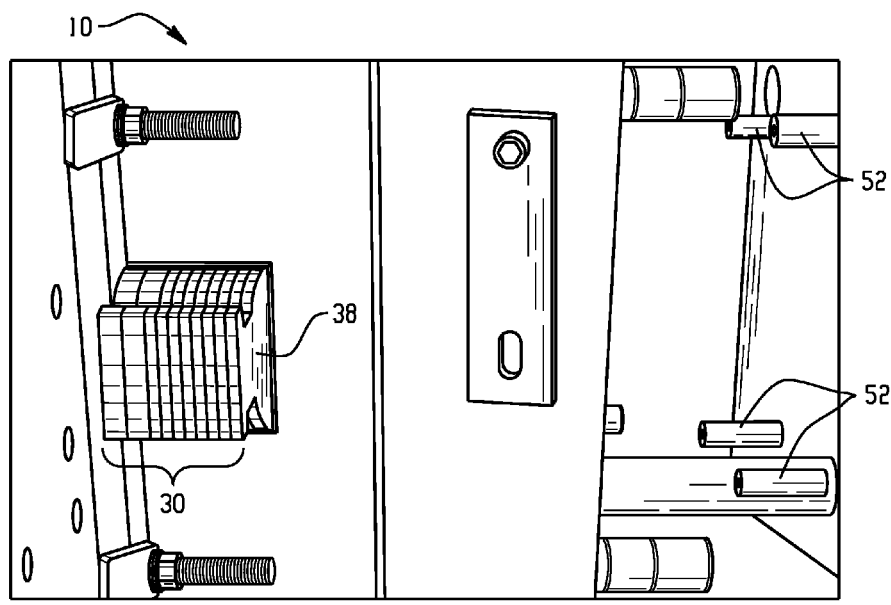
FIG. 5A, FIG. 5B, and FIG. 5C depict the removal of a first support plate, in accordance with an embodiment.
Figure 6:
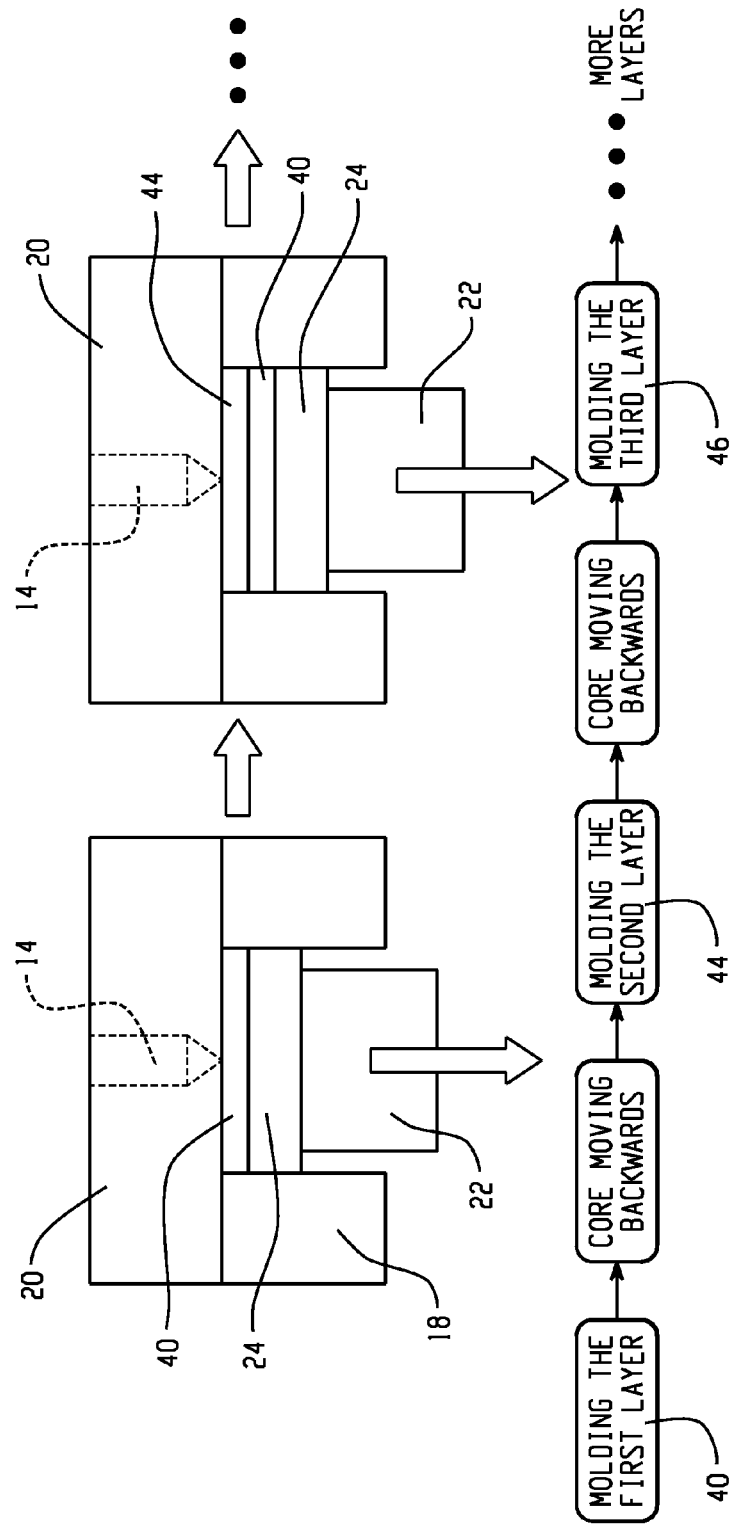
FIG. 6 is a schematic depiction of a molding process according to an embodiment.

As shown in FIG. 5A, all of the support plates 30 can be first installed in tool 10. As FIG. 6 shows, a first material can be injected by injection molding into an existing space or cavity to form the first layer 40. Packing can be applied to help ensure that there is no shrinkage after molding. For example, after injection, pressure could be applied on a gate until the part 12 is fully filled. The application of high pressure and low speed can aid the deposited resin to tightly fill the cavity.

After the first shot is finished, ejection rod 35 (FIG. 1) in the injection machine can eject the support plates 30 (e.g., by moving a sufficient distance to enable the support plate to be removed, 1 mm, for example), and retract. The support plates 30 can become loose, and a first support plate can be removed. As the internal core 22 can be connected to the ejector plate 26, when first support plate 38 is removed, a space or gap can be created behind the ejector plate 26. Tool 10 can then be closed with keeping the remaining support plates 30 in the tool 10, wherein the early return pin 52 can engage or kick return pin 51. The return pin 51 is connected with ejector plate 26. Ejector plate 26 can move, for example, back or down and the internal core 22 and the undercut 24 can move accordingly together with the ejector plate 26 to create a first gap within the cavity 20, the thickness of the first gap being determined by the thickness of the removed, first movable support plate 38. Thus, the thickness of the first gap can be the same as the thickness of the first movable support plate 38. A second material can be injected into the first gap to mold the second layer 44, as schematically shown in the process example set forth in FIG. 6 and described below, onto the undercut 24 for example, the second layer 44 having a thickness which is the same as the thickness of the removed, first support plate 38. More particularly, this process can be repeated, as desired, to generate the final intended thickness.

It is noted that, according to embodiments, after deposition of the first material for the first layer 40, the first layer 40 can cool, as desired, such as to the material to a recommended tool temperature prior to deposition the next layer, which is described below. A traditional cooling line or system can be located within the internal core 22 to maintain the temperature of the product, as described above. It is further noted that corresponding cooling can be conducted after deposition of each deposited layer and prior to deposition of the next layer deposited thereon. Cold air also could be employed to flow upon the molded part surface to speed up the cooling to decrease the cycle time. Thus, optionally, each layer can be sufficiently cooled and solidified prior to deposition of the next layer, and thus adhere to each other in multiple layers.

Figure 5B:
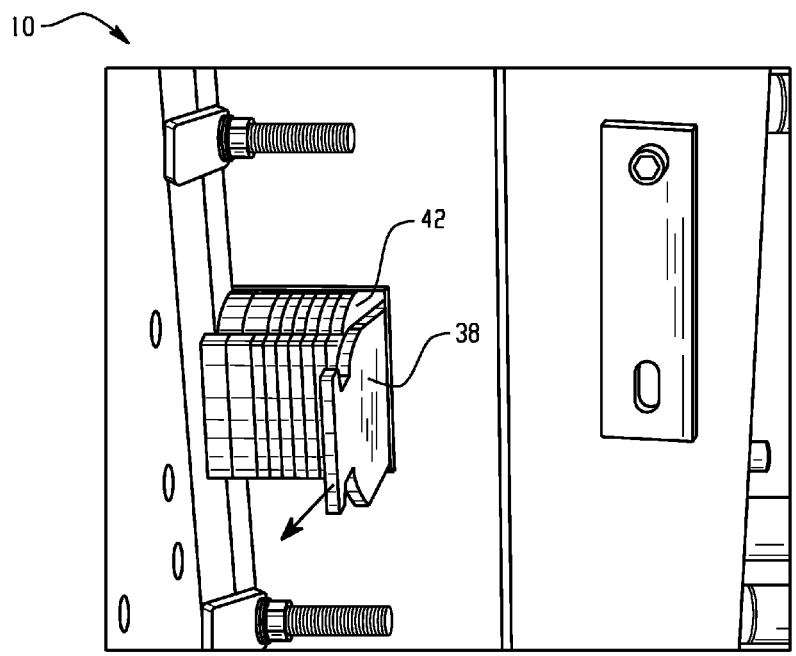
Figure 5C:
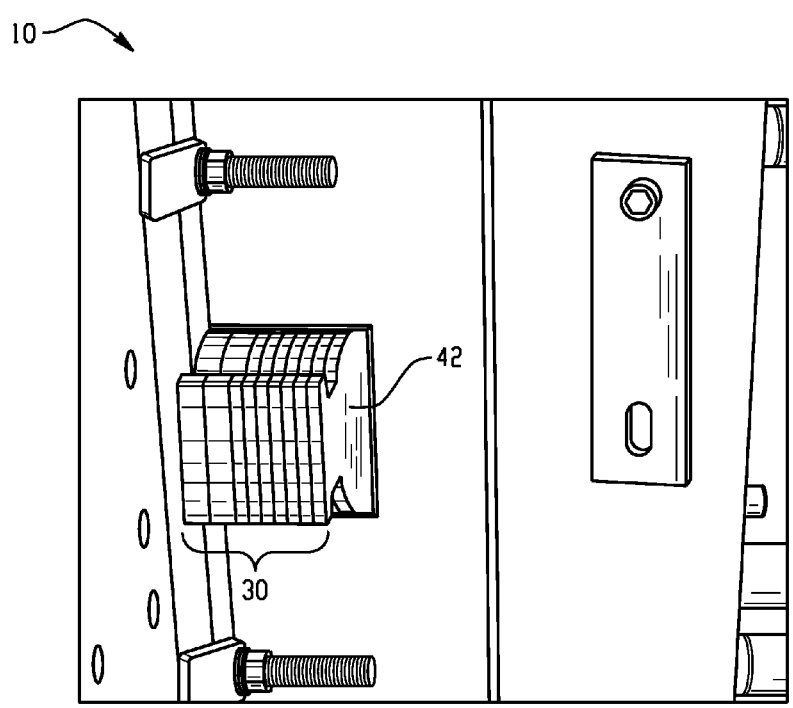

After tool 10 is opened, the support plates 30 can be ejected by use of ejection rod 35 to remove a second support plate 42, which is shown in FIG. 5B and FIG. 5C at 42, having a desired thickness.

It is noted that, according to embodiments, the inventors have determined that the support plates 30 behind the ejector plate 26 should be ejected e.g., by 1 mm, and the distance can be varied as long as the support plates are loose enough after the ejection rod 35 is retracted, but desirably, the distance will not exceed the first layer 40 thickness minus 0.5 mm, according to embodiments. If this distance is exceeded, the part could potentially drop from the tool 10. According to embodiments, the ejection distance can be less than or equal to 2 mm to allow the support plates 30 to be effectively removed and not be maintained compressed together by injection pressure. Thus, the support plates 30 can become loose and easily removed.

Accordingly, the tool 10 can then be closed to keep the remaining support plates 30 in the tool 10, wherein the ejector plate 26 can be ejected, for example, back or down and the internal core 22, the undercut 24, the first layer 40 and the second layer 44 can move accordingly together with the ejector plate 26 to create a second gap within the cavity 20, the thickness of the second gap being determined by the thickness of the removed, second movable support plate 42.

Thus, upon cooling, a further material can then be injected into the second gap to mold a third layer 46 onto the second layer 44, wherein the second layer 44 can thus have a thickness which is the same as the thickness of the removed, first movable support plate 38, as describe above, and the third layer 46 can have a thickness which is the same as the thickness of the removed, second support plate 42.

The above process could then be repeated as needed or desired until, for example, all support plates 30 are removed to produce the multiple-layered molded part 12.

Thus, in accordance with an embodiment, all of the support plates 30 could be located behind the ejection plate 26 and the first layer 40 could be molded on the internal core 22, for example directly on the undercut 24, prior to removal of any support plates 30. The thickness of the first layer 40 can be determined by the initial designed space as desired as no support plate 30 has yet to be removed. Processing as described above could then be completed. This space can be also changed by inserting additional support plates 30 or taking out certain support plates 30, which can produce plaques of different thickness.

FIG. 6 schematically illustrates a molding process according to an embodiment wherein the support plates 30 are 2.5 mm each in thickness. As shown, therein, a first layer 40 of desired first material can be deposited on an undercut 24 and the internal core then moves 2.5 mm upon removal of a 2.5 mm support plate 30. A second layer 44 of desired second material can then be deposited on the first layer 40 after cooling of the first layer 40 and the internal core 22 then moves 2.5 mm upon removal of another 2.5 mm support plate 30. A third layer 46 (not shown) can be deposited, and the process can be continued as desired. Thus, the thickness of the removed support plate 30 determines the thickness of the respective deposited layer, and can be varied/tailored as desired.

Similarly, according to embodiments, the material for each deposited layer of the resultant article could be same or could be different, and any number of layers could potentially be produced. Thus, for example, three, four or more layers with three, four or more different kinds of material, respectively, could be produced. It is noted that if a different material is chosen for a subsequent layer, the materials should be capable of adhering to each other to avoid delamination of the product. For example, polycarbonate (PC) and acrylonitrile butadiene styrene (ABS) are suitable materials for adherency. Also, if the material is known as suitable for double shot or triple shot processing, then these materials would also have proper adherency with each other and be suitable for processing, according to embodiments. The material for each deposited layer could also be the same or different in color. Similarly, the material for each deposited layer could also be transparent.

Figure 7:
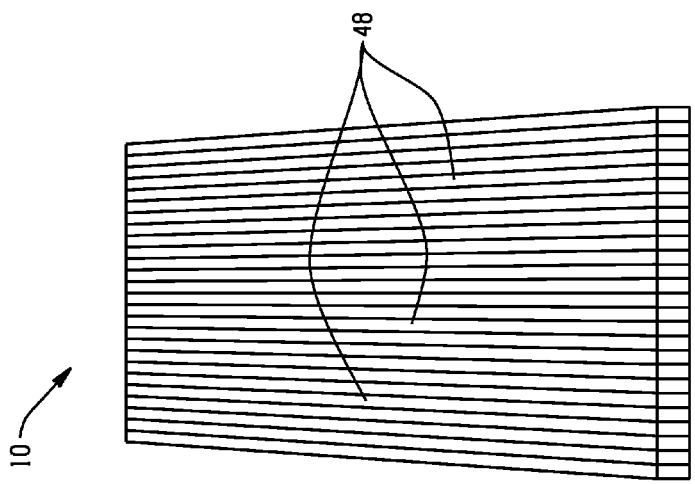
FIG. 7 is a depiction of a portion of FIG. 2 showing multiple layers indicated by ridges, according to an embodiment.

An example of a multiple-layered molded part 12 is shown in FIG. 2 as a 65 millimeters (mm) thick plastic transparent block (length*width=100 mm*100 mm), although other shapes and sizes of part 12 are possible, according to embodiments. FIG. 7 depicts a portion of the mold part 12 of FIG. 2 showing the multiple layers 48 indicated by ridges.

Embodiments disclosed herein are not limited to producing large blocks. For example, plaques of different thickness also could be made by the tool 10, according to embodiments. For example, the inventors have successfully achieved a thickness variation from, for example, 0.5 mm to 65 mm in thickness, increasing by 0.5 mm. More thickness variation can be achieved by making more support plates 30 of different thickness. As a further example, plaques or single layers of 0.6 mm, 0.8 mm, 2 mm, 2.5 mm, etc., or of any suitable thickness typically up to about 5 mm could be produced.

Thus, embodiments disclosed herein also can be useful in the study of materials and material properties such as, for example, studying the translucency of a material at various thicknesses, as plaques of different thicknesses could be produced. Thus, a single layer of material of a constant thickness could be produced for testing. The single layer could be compared to other single layers of different, constant thicknesses for comparative studies of material properties such as transparency, adhesion, etc.

Another advantage of embodiments disclosed herein is that the processing can be continuous as the layers can be continuously added. The maximum thickness can be increased as more space is designed in the cavity and behind the ejector plate 26.

The use of a hydraulic cylinder can also be another option to drive the ejector plate 26 to move the internal core 22 instead of using support plates 30. This embodiment could employ additional location sensors to control the location of the ejector plate 26 of each shot, and further automate the system.

Figure 8A:
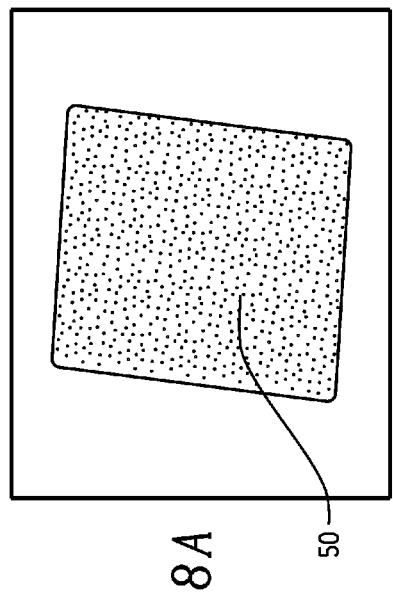
FIG. 8A and FIG. 8B depict texturing at the cavity side according to an embodiment.
Figure 8B:
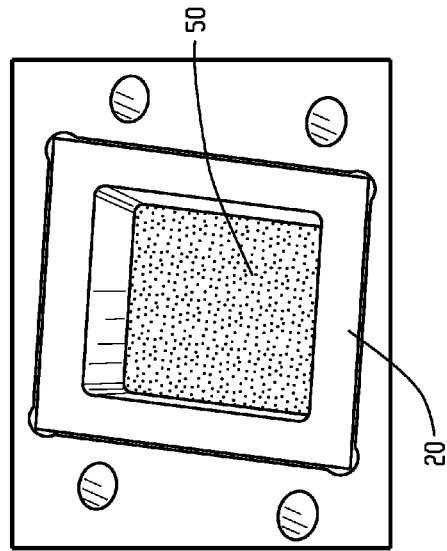

Additionally, according to embodiments, the inventors have determined that applying texture 50 at the cavity side 20 (see FIG. 8B) could increase the adhesion force between each layer because the surface is roughened and not smooth. Thus, a roughened surface could be located between each layer for improved adhesion. More particularly, as shown in FIG. 8A, the texture applied can be MT (Mold Tech) 11050 finish by chemical etching, among other finishes or textures MT11050 is an example of a SPI (Society of Plastics Industry) pattern. SPI patterns are known to be computer generated patterns.

Figure 9A:
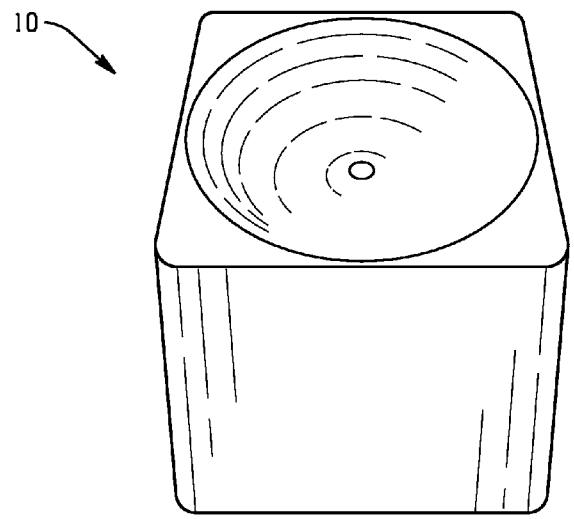
FIG. 9A, FIG. 9B, and FIG. 9C depict sample molded blocks after testing, according to embodiments.
Figures 9B, 9C:
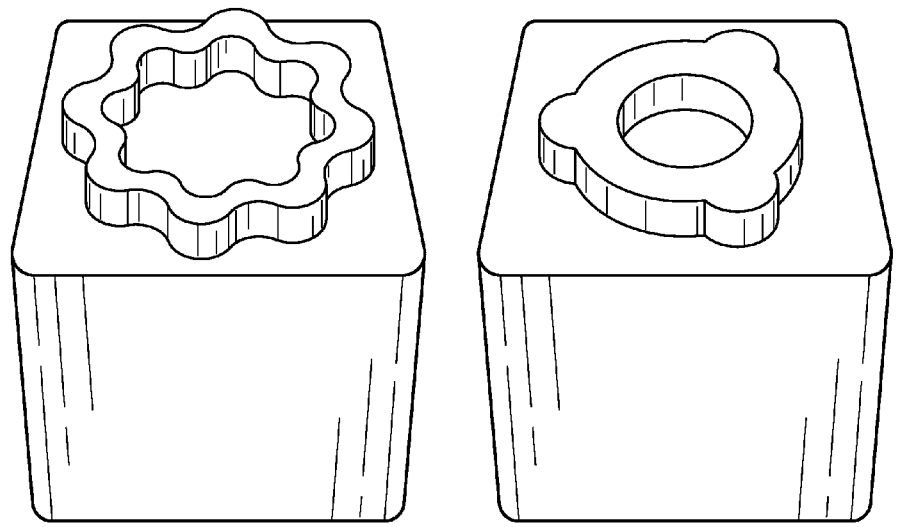

Further advantages of embodiments disclosed herein include the effectiveness in producing the resultant molded product. For example, CNC machining testing of the aforereferenced 65 mm block sample (molded thick part 12) has resulted in no breaks found between the layers, thus indicating that effective adhesion exists between the layers. More particular, the tested block was made of polycarbonate/acrylonitrile butadiene (PC/ABS) and subjected to CNC machining with an applied spinning speed of 2000 rpm. FIGS. 9A, 9B and 9C show samples of molded thick part 12 after testing.

It is further noted that in accordance with embodiments, the support plates 30 could be ejected or moved by, for example, up to 2 mm or more, to release the compression of the support plates 30 and allow one of support plates 30 to be removed, as described above, and the ejection rod 35 can retract and remain retracted.

In some embodiments, a method of making a multiple-layered plastic part, comprises, sequentially, in an injection molding machine comprising a tool, the tool comprising a cavity, a movable internal core, an injection nozzle, an ejector plate connected to the movable internal core, an ejection rod, and movable support plates, each of the movable support plates having a thickness, wherein all of the movable support plates are located behind the ejector plate: a) injecting a material from the injection nozzle to deposit a layer over the movable internal core and form a molded layer. The method also comprises b) opening the tool and ejecting the movable support plates by use of an ejection rod followed by retraction of the rod to remove a movable support plate thereby leaving remaining support plates in the opened tool; c) closing the tool while keeping the remaining support plates in the tool, wherein the ejector plate is ejected back or down and the internal core moves together with the ejector plate to create a gap within the cavity, the thickness of the gap being determined by the thickness of the removed, movable support plate of b); and d) molding a further layer over the molded layer and within the gap, the thickness of the further layer being the same as and determined by the thickness of the removed, movable support plate. The method further comprises repeating b) through d) until all of the movable support plates are removed from the tool to produce a molded multiple-layered plastic part.

In another embodiment, a method of making a plastic part comprises, sequentially, in an injection molding machine comprising a tool, the tool comprising a cavity, a movable internal core comprising an undercut, an injection nozzle, an ejector plate connected to the movable internal core, an ejection rod, and movable support plates, each of the movable support plates having a thickness, wherein all of the movable support plates are located behind the ejector plate: a) injecting a first material from the injection nozzle into an existing space and onto the undercut in the tool to mold a first layer; b) opening the tool and ejecting the movable support plates using an ejection rod followed by retraction of the rod to remove a first movable support plate thereby leaving remaining support plates in the opened tool. The method also comprises c) closing the tool while keeping the remaining support plates in the tool, wherein the ejector plate is ejected back or down and the first layer, internal core, and the undercut move together with the ejector plate to create a first gap within the cavity, the thickness of the first gap being determined by the thickness of the first removable support plate; and d) injecting a second material into the first gap to mold a second layer over the internal core, the thickness of the second layer being the same as and determined by the thickness of the first removable support plate, to produce the plastic part.

In another embodiment, a method of making a multiple-layered plastic part, comprises: a) injecting a material onto an internal core of a tool to form a molded layer, the tool comprising support plates, each support plate having a thickness; b) opening the tool and removing a support plate; c) closing the tool, wherein a gap having a thickness is created in the tool, the thickness of the gap being determined by the thickness of the support plate removed in b); d) molding a further layer over the molded layer and within the gap, the thickness of the further layer being determined by the thickness of the support plate removed in b); and repeating b) through d) to produce the molded multiple-layered plastic part.

In a further embodiment, a method of making a plastic part comprises: a) injecting a first material onto an internal core of a tool to form a molded layer; b) opening the tool and removing a first support plate; c) closing the tool, wherein a gap having a thickness is created in the tool, the thickness of the gap being the same as and determined by the thickness of the first support plate removed in b); and d) molding a second layer over the first layer and within the gap, the thickness of the second layer being determined by the thickness of the first support plate removed in b), to produce the plastic part.

In another embodiment, a tool comprises, in an injection molding machine, a movable internal core configured to receive a molded plastic layer thereon, the molded plastic layer having a thickness. The tool also comprises an injection nozzle configured to inject plastic material over the movable internal core to form the molded plastic layer; an ejection plate connected to the movable internal core; and multiple, movable support plates each having a thickness. The multiple, movable support plates are located behind the ejection plate. A movable support plate of the multiple, movable support plates is configured to determine the thickness of the molded plastic layer.

In accordance with various embodiments, i) the internal core is movable and comprises an undercut, and the molded layer is deposited directly onto the undercut; and/or ii) step b) comprises moving the support plates up to 2 mm and then removing the support plate; and/or iii) a roughened surface is located between each layer; and/or iv) the molded, multiple-layered plastic part is a thick plastic part greater than 5 mm in thickness; and/or v) the thick plastic part is less than or equal to 65 mm in thickness; and/or vi) each layer of the molded, multiple-layered plastic part comprises the same material; and/or vii) each layer of the molded, multiple-layered plastic part comprises a different material; and/or viii) the multiple-layered plastic part comprises ridges; and/or ix) each layer is cooled prior to deposition of a next layer thereon; and/or x) the plastic part comprises a test plaque; and/or xi) the test plaque is between 0.5 mm to 5 mm in thickness; and/or xii) step b) comprises moving the support plates up to 2 mm and then removing the first support plate; and/or xiii) step b) comprises moving the first support plate by greater than or equal to 1 mm and then removing the first support plate; and/or xiv) step e) comprises opening the tool and removing a second support plate; and/or xv) step f) comprises closing the tool, the tool further comprising an ejector plate connected to the internal core, wherein the ejector plate, the internal core, the first layer and the second layer move together to create a second gap in the tool, the thickness of the second gap being determined by the thickness of the second support plate; and step g) comprises molding a third layer onto the second layer after the second layer has cooled, the third layer having a thickness which is determined by the thickness of the second support plate; and/or xvi) the method comprises molding subsequent layers until all of the support plates are removed from the tool to produce a molded multiple-layered plastic part; and/or xvii) the internal core comprises an undercut, and a roughened surface is located between each layer; and/or xviii) a thick plastic part made by an above method has a thickness greater than 5 mm; and/or xix) the thick plastic part is a block comprising dimensions of 65 mm by 100 mm by 100 mm; and/or xx) the block is transparent; and/or xxi) the block is a prototype sample; and/or xxii) the movable internal core comprises an undercut, the undercut configured to directly receive the injected plastic material to form the molded layer directly on the undercut; and and/or xxiii) the tool is configured to eject the movable support plates by use of an ejection rod followed by retraction of the ejection rod to remove a support plate.

The terms "a" and "an" and "the" herein do not denote a limitation of quantity, and are to be construed to cover both the singular and the plural, unless otherwise indicated herein or clearly contradicted by context. Reference throughout the specification to "one embodiment", "another embodiment", "an embodiment", and so forth, means that a particular element (e.g., the feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A method of making a multiple-layered plastic part, comprising:
   a) injecting a material onto an internal core of a tool to form a molded layer, the tool comprising an ejector plate connected to the internal core and support plates located behind the ejector plate opposite the internal core, each support plate having a thickness;
   b) opening the tool and removing a support plate from behind the ejector plate;
   c) closing the tool, wherein a gap having a thickness is created in the tool, the thickness of the gap being determined by the thickness of the support plate removed in b);
   d) molding a further layer over the molded layer and within the gap, the thickness of the further layer being determined by the thickness of the support plate removed in b); and
   repeating b) through d) to produce a molded multiple-layered plastic part.

2. The method of claim 1, wherein the internal core is movable and comprises an undercut, and the molded layer is deposited directly onto the undercut.

3. The method of claim 1, wherein b) comprises moving the support plates up to 2 mm and then removing the support plate.

4. The method of claim 1, comprising a roughened surface between each layer.

5. The method of claim 1, wherein the molded, multiple-layered plastic part is a thick plastic part greater than 5 mm in thickness.

6. The method of claim 5, wherein the thick plastic part is less than or equal to 65 mm in thickness.

7. The method of claim 1, wherein each layer of the molded, multiple-layered plastic part comprises the same material.

8. The method of claim 1, wherein each layer of the molded, multiple-layered plastic part comprises a different material.

9. The method of claim 1, wherein the multiple-layered plastic part comprises ridges.

10. The method of claim 1, wherein each layer is cooled prior to deposition of a next layer thereon.

11. A method of making a plastic part comprising:
a) injecting a first material onto an internal core of a tool to form a molded layer, wherein the internal core is connected to an ejector plate and support plates are located behind the ejector plate opposite the internal core;
b) opening the tool and removing a first support plate from behind the ejector plate;
c) closing the tool, wherein a gap having a thickness is created in the tool, the thickness of the gap being determined by the thickness of the first support plate removed in b); and
d) molding a second layer over the first layer and within the gap, the thickness of the second layer being determined by the thickness of the first support plate removed in b), to produce the plastic part.

12. The method of claim 11, wherein the plastic part comprises a test plaque.

13. The method of claim 12, wherein the test plaque is between 0.5 mm to 5 mm in thickness.

14. The method of claim 11, wherein b) comprises moving the support plates up to 2 mm and then removing the first support plate.

15. The method of claim 14, wherein b) comprises moving the first support plate by greater than or equal to 1 mm and then removing the first support plate.

16. The method of claim 11, further comprising: e) opening the tool and removing a second support plate from behind the ejector plate;
f) closing the tool, wherein the ejector plate, the internal core, the first layer and the second layer move together to create a second gap in the tool, the thickness of the second gap being determined by the thickness of the second support plate; and
g) molding a third layer onto the second layer after the second layer has cooled, the third layer having a thickness which is determined by the thickness of the second support plate.

17. The method of claim 16, further comprising molding subsequent layers until all of the support plates are removed from the tool produce a molded multiple-layered plastic part.

18. The method of claim 17, wherein the internal core comprises an undercut, and a roughened surface is located between each layer.

* * * * *